Nov. 28, 1950
A. H. BERGEMANN
2,531,838
LATCHING RELAY
Filed Aug. 8, 1947
2 Sheets-Sheet 1
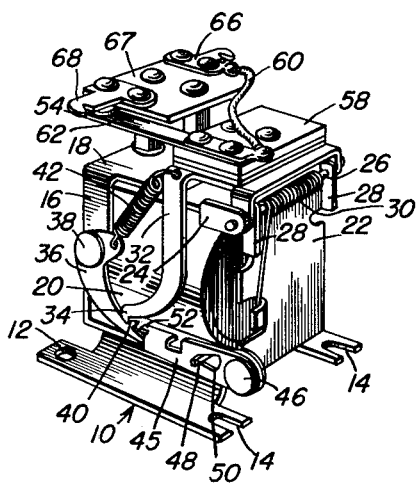
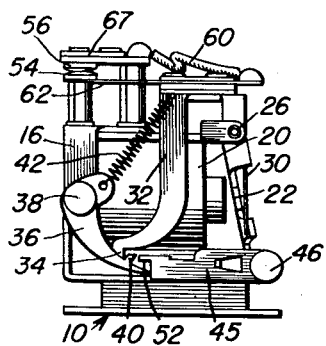
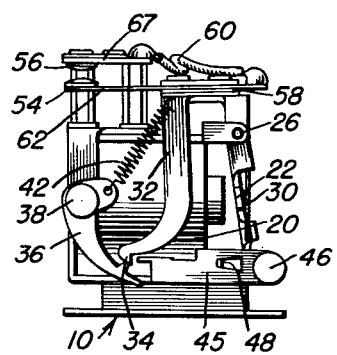
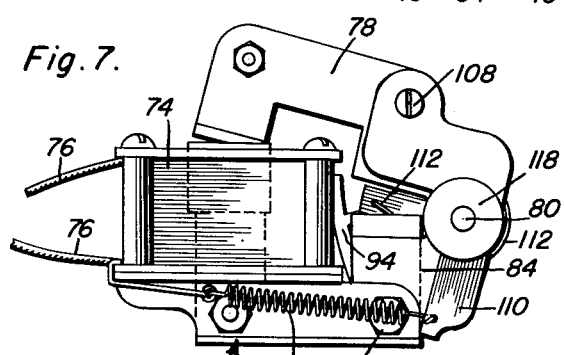
Inventor
Arnold H. Bergemann
By *Clarence A. O'Brien and Harvey B. Jacobson*
Attorneys Inventor
Arnold H. Bergemann Patented Nov. 28, 1950

2,531,838

UNITED STATES PATENT OFFICE 2,531,838

LATCHING RELAY

Arnold H. Bergemann, North Mankato, Minn.

Application August 8, 1947, Serial No. 767,436

4 Claims. (Cl. 74—2)

This invention relates to novel and useful improvements in relays of the electrically operated type.

An object of this invention is to provide a novel arrangement of link means as well as resilient biasing means for performing the function of making and breaking electrical circuits.

Another object of this invention is to provide electrically operated coil means within a frame support and means for latching a circuit control device in selective operative and inoperative position in accordance with successive operations motivated by energizing the coil.

A further object of this invention is to provide an efficiently operated, dependable device of the character described which is commercially feasible and which further lends itself well to commercial manufacture and common shop practices.

Other objects and features of novelty shall become apparent to those skilled in the art, in following the description of the preferred embodiment of the present invention, illustrated in the accompanying drawings, wherein:

Figure 1 is a perspective view of one form of the present invention;

Figure 2 is an elevational side view of the invention disclosed in Figure 1;

Figure 3 is an elevational side view of the invention disclosed in Figure 1, showing a second phase in the operative cycle thereof;

Figure 7 is an elevational side view of the invention disclosed in Figure 4, showing certain elements when viewing Figure 4 from a selected side.

Referring now in detail to the illustrated preferred embodiment of the present invention, like reference characters are used throughout to indicate similar elements thereof.

Figure 4:
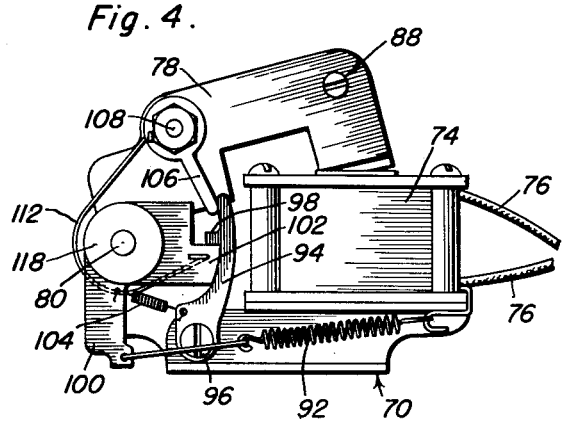
Figure 4 is an elevational side view of a second form of the present invention.
Figure 5:
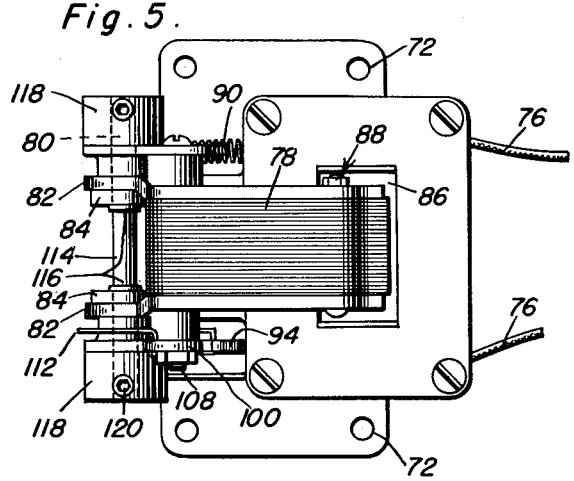
Figure 5 is an elevational plan view of the invention disclosed in Figure 4.

This invention has been conceived and developed to provide a device whose utility extends to any environments including electric light control, motors, fans, elevator equipment, telephone equipment and many others. The general purpose of the invention is embodied in the principle of making and breaking circuits and retaining the said circuits in the broken or unbroken stage through utility of latching devices in the circuit breaker. In carrying out this principle only a single coil is utilized, requiring but a single impulse of current. The general design of both embodiments of the present invention is such that friction has been maintained at a minimum thereby permitting more rapid operation as well as greater precision.

Taking first the embodiment of the invention disclosed in Figures 1-3 inclusive, a frame 10 is provided of any suitable material, preferably metallic and has convenient apertures 12 and slots 14 therein for the purpose of mounting the same. This frame 10 extends upwardly in an arm-like member 16 thence a continuation of said arm-like member 18 provides a top member of the said frame 10. A coil 20, conventional in nature, is provided within the said frame 10 and suitable terminals (not shown) extend from said coil. These terminals or lead wires are to be secured in a circuit as dictated by the particular use to which the invention is employed. An arm 22 is pivotally mounted to the said frame 10 and more specifically, is secured to the integral extension 24, provided on the top member 18. A suitable shaft or pivot pin 26 extends through the integral extension and through ears 28, provided on the arm 22. Means for resiliently biasing the said arm 22 is provided, said means consisting preferably of a coil spring 30 engaging the under portion of the said cover member 18 and the back portion of the said arm 22. It is obvious that this spring 30 will constantly bias the arm 22 away from the coil 20. It is further apparent that upon energizing the coil 20, which has a core extending through the center thereof, the arm 22 will be attracted thereto against the biasing force of the spring 30.

A switch operating lever 32 is pivotally secured to the said frame 10 by utility of the said pivot pin 26 as a common mount. This lever has an arcuate terminal portion with a latch at the tip of said portion. This latch is a simple protuberance 34 integral therewith and extending therefrom.

Means for engaging the said latch or protuberance 34 is pivoted to the frame 10 and more specifically, to the said upwardly extending member 16. This latch engaging means is preferably a crank 36 having a pivot pin 38 extending substantially through the bight thereof. An extension 40 is preferably integral with the said crank 36 and is adapted to selectively engage the latch or protuberance 34. Means for resiliently biasing the said crank 36 in relation to the movement of the lever 32 is provided. This means consists of a conventional spring 42 secured in suitable apertures provided in the upper portion of the said lever 32 and adjacent the terminal portion of the crank 36. It is apparent from this structure described above that a predetermined resilient force is exerted between the lever 32 and the crank 36 upon movement thereof.

Actuating means is pivotally secured to the arm 22 for selective engagement with the protuberance 34 and extension 40. This means preferably a mechanical link 45 having a pivot pin 46 coupling the same to the said arm 22. A cam follower 48 extends from the said frame 10 and is engageable with a cam slot 50, provided in the link 45. This cam engaging the said cam slot restricts the travel of the link 45 to a predetermined path. A lug 52 extends from the said link 45 and is selectively engageable with the protuberance 34 and extension 40.

In operation of the invention the electro-magnetic force attracts the arm 22 to the coil 20 upon energizing said coil. Of course, the link 45 is then forced against the extension 40 thereby urging the same out of engagement with protuberance 34. (See Figure 3.) In this position, the contact 54, which is secured to the upper portion of the lever 32, is separated from a stationary contact 56 which is rigidly secured to the said frame 10. The contact 54 is seated on an insulating block 58 thereby electrically separating said contact from other associated mechanism of the invention. A conductor 60 extends from the resilient contact arm 62 on which the contact 54 is mounted, and to a second terminal 66. This second terminal is also mounted on an insulating block 68 which is permanently secured in an immovable position on the frame 10. Of course, when the protuberance 34 and extension 40 are in reversed positions contacts will be in appropriate relative positions in order to selectively complete and break the circuit which may be attached to the terminals 66 and 68. It is quite obvious that the latching device described above will retain the circuit in its opened or closed position.

Going now to a second form of the inventive concept, reference is made to Figures 4 through 7 inclusive. Here, a frame 70 is provided of any suitable material and has apertures 72 in the base thereof for the usual securing function.

A coil 74 is secured to the said frame 70 and appropriate leads 76 extend therefrom. These leads serve the same purpose as described in the first embodiment of the invention. An arm 78 is pivoted to the said frame 70 by utility of a pivot pin 80 extending through suitable ears 82 projecting from said arm and through extensions 84 integral with and forming a part of the frame 70. The said arm 78 is adapted to extend into an aperture 86 in the said coil 74. In effect, a solenoid construction is devised whereby upon energizing the coil 74 the laminated arm 78 is attracted thereto. As herein mentioned, the said arm 78 is laminated and a bolt and nut construction 88 may be utilized in retaining the laminations in a single, operative arm.

Means for resiliently biasing the said arm 78 is provided. This means consists of a spring 90 which is secured to said arm and one side of the frame 70. This construction is seen in Figure 7. It will be noted that Figures 6 and 7 disclose similar springs 90 and 92 however, the spring 90 is secured to the arm 78 which projects below the pivot pin 80 while the showing of the invention in Figure 6 discloses that the said arm 78 does not extend below the pivot pin 80 on one side of the device and that the spring 92 reacts on the frame 70 and a bell crank 100, fixedly mounted on the pivot 80.

A latching lever 94 is pivoted to said frame 70 by utility of a conventional screw 96 as a pivot point. A protuberance 98 extends from said latching lever 94 and serves the purpose of a latch.

Means for engaging said latch 98 is pivotally secured to the said arm 78. This means is the bell crank 100 provided on the common pivot 80. An extension 102 is provided on said crank and is engageable with the protuberance 98. Correlation of Figures 4 and 6 disclosed selected positions of the extension and protuberance 102 and 98 respectively.

Means for resiliently biasing the lever 94 and crank 100 is provided and this means consists of a spring 104 extending across the crank 100 and the said lever 94. This spring is received in suitable apertures on the respective members.

There is also provided means pivoted to the arm 78 for engaging the latch protuberance 98 and the extension 102. Attention is again referred to Figures 4 and 6 wherein the reference numeral 106 designates this element. A bolt 108 is utilized for pivoting the said engaging member 106 to the arm 78. This bolt also assists in retaining laminations in the arm 78 and serves a third purpose of retaining a portion or extension 110 of the arm 78 in the desired, fixed position. It will be noted that the lowermost portion of the said extension engages the frame 70 in certain operative positions thereby forming a stop means.

Figure 6:
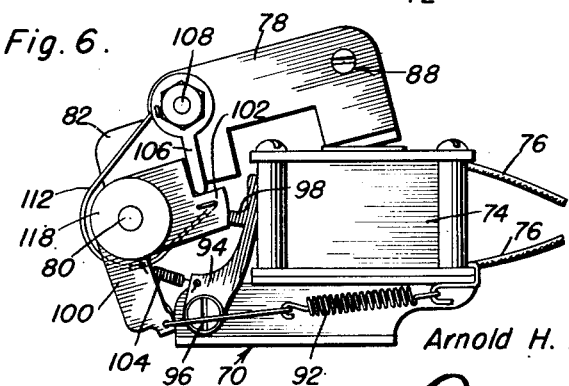
Figure 6 is an elevational side view of the invention disclosed in Figure 4 showing relative position of certain elements during the phase of operation.

A single coil spring 112 is secured to the member 106, extending around the pivot shaft 80 and terminating in a suitable aperture provided in the bell crank member 100. This spring forms an important part of the invention as it biases the member 106 upwardly when the latch members are in the closed position as seen in Figure 4. When the crank 100 of the said latch members is in the raised position as shown in Figure 6, the spring 112 is tensioned thereby pulling the member 106 downwardly to an operative position.

In assembly, a sleeve 114 is interposed between the frame extensions 84 and resilient clips 116 are utilized in retaining the said sleeve in the proper fixed position. Also, the shaft or pivot pin 80 extends outwardly from both ends of the arm 78 and suitable circuit breaking members 118 are secured thereto by any suitable conventional means, such as screws 120. It is these members 118 which are utilized in making and breaking circuits. They operate on electrical contacts by cams or ratchet devices or contact fingers or any other conventional, well known equivalent. Hence, it is only necessary to rotate the members 118 periodically to make and break a circuit in the desired manner.

In operation of this species of the device attention is invited first to Figure 4. Upon energizing the armature 78, the member 106 is pressed against the latching lever 94, pivotally urging the same. At the same time the spring 92 which constantly urges the bell crank 100 in a pivotal manner about the shaft 114 as an axis, is allowed to rotate the bell crank to the position shown in Figure 6 with one of the pivots 80. However, before this rotation takes place and while the armature 78 is in the down position, the bell crank will engage the member 106. This is not a serious difficulty, however, since the armature 78 raises to the position shown in Figure 4 upon deenergizing the coil. Hence, the bell crank 100 is allowed to assume the position shown in Figure 6.

In order to reset the device, it is only necessary to energize the coil again. Energizing the said coil urges the armature 78 downwardly in a pivotal manner about the shaft 114 as an axis thereby also pivotally moving the bell crank 100 through the action of the member 106 bearing on the bell crank and movable therewith. Accordingly, the extension 98 engages over the top portion of the appropriate place in the bell crank 100 thereby latching it in the closed position. Accordingly, the device is then set as shown in Figure 4.

The action of the spring 112 is of importance in setting the device from that position shown in Figure 4 to that shown in Figure 6. When the armature 78 is pulled downwardly into the coil 74, the spring 112 constantly biases the member 106 against the latching lever 94 urging it in out of locking engagement with the bell crank 100.

While there has been described and illustrated but preferred embodiments of the present invention, similar in structure and function it is apparent to those skilled in the art that various changes may be made herein without departing from the spirit of the invention. Accordingly, limitation is sought only in accordance with the scope of the following claims.

Having described the invention, what is claimed as new is:

1. In an electrically set and reset latch relay, a frame, a coil mounted on said frame, a shaft supported by said frame for rotation, and an armature mounted on said shaft for pivotal movement, means actuated by said armature upon successive energization of said coil for setting and resetting said shaft in various positions of rotation including a bell crank pivotally disposed on said shaft, a latching lever pivoted to said frame, locking means formed on said latching lever and said bell crank, a spring carried by said latching lever and said bell crank constantly urging said latching means in the locked position, and an actuator member pivoted to said armature operatively engaging said locking means upon actuation of said armature for releasing said locking means.

2. In an electrically set and reset latch relay, a frame, a coil mounted on said frame, a shaft rotatively supported by said frame, and an armature mounted on said shaft for pivotal movement, means actuated by said armature upon successive energization of said coil for setting and resetting said shaft in various positions of rotation including a bell crank pivotally disposed on said shaft, a latching lever pivoted to said frame, locking means formed on said latching lever and said bell crank, a spring carried by said latching lever and said bell crank constantly urging said latching means in the locked position, and an actuator member pivoted to said armature operatively engaging said locking means upon actuation of said armature for releasing said locking means and operatively engaging said locking means upon a second cyclic movement of said armature for resetting said locking means.

3. In an electrically set and reset latch relay, a frame, a coil mounted on said frame, a shaft rotatively supported by said frame, and an armature mounted on said shaft for pivotal movement, means actuated by said armature upon successive energization of said coil for setting and resetting said shaft in selected positions of rotation including a bell crank pivotally disposed on said shaft, a latching lever pivoted to said frame, locking means formed on said latching lever and said bell crank, a spring carried by said latching lever and said bell crank constantly urging said latching means in the locked position, and an actuator member pivoted to said armature operatively engaging said locking means upon actuation of said armature for releasing said locking means, and means reacting on said frame and said armature constantly urging said armature in spaced relation with respect to said coil.

4. The combination of claim 1 and a cam surface on said bell crank forming a portion of said locking means slidably engaged by another portion of said locking means upon actuation of said armature.

ARNOLD H. BERGEMANN.

REFERENCES CITED

The following references are of record in the file of this patent:

UNITED STATES PATENTS

| Number | Name | Date |
| --- | --- | --- |
| 281,202 | Phelps | July 10, 1883 |
| 385,494 | Wright | July 3, 1888 |
| 1,052,891 | Corell | Feb. 11, 1913 |
| 1,288,738 | Suren | Dec. 24, 1918 |
| 1,726,391 | Goff | Aug. 27, 1929 |
| 1,961,857 | Hanel | June 5, 1934 |
| 1,980,458 | Westerfelhaus | Nov. 13, 1934 |
| 2,079,577 | Parsons | May 4, 1937 |